United States Patent
Hirota (12)

(10) Patent No.: US 6,457,696 B1
(45) Date of Patent: Oct. 1, 2002

(54) PILOT OPERATED FLOW REGULATING VALVE

(75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 09/428,189

(22) Filed: Oct. 27, 1999

(30) Foreign Application Priority Data

Nov. 6, 1998 (JP) .......................................... 10-315763
Jan. 22, 1999 (JP) .......................................... 11-013685

(51) Int. Cl.[7] .............................................. F16K 31/12
(52) U.S. Cl. ...................... 251/30.02; 251/33; 251/61.4
(58) Field of Search ............................. 251/61.4, 30.01, 251/30.02, 33

(56) References Cited

U.S. PATENT DOCUMENTS

| | | | | |
|---|---|---|---|---|
| 3,135,281 A | * | 6/1964 | Morgan | 251/30.01 |
| 3,462,115 A | * | 8/1969 | Barker | 251/30.01 |
| 3,669,143 A |   | 6/1972 | Reese | 137/512.3 |
| 3,808,829 A | * | 5/1974 | Peruglia | 251/30 X |
| 3,896,843 A |   | 7/1975 | Millar et al. | 137/486 |
| 3,913,884 A | * | 10/1975 | Rolfe | 251/30 X |
| 4,058,287 A | * | 11/1977 | Fromfield | 251/33 X |
| 4,318,425 A | * | 3/1982 | Marks | 251/368 X |
| 4,431,020 A |   | 2/1984 | Kowalksi | 137/110 |
| 4,469,134 A | * | 9/1984 | Kanai et al. | 251/30 X |
| 4,477,051 A |   | 10/1984 | Ben-Yehuda | 251/30 |
| 4,503,887 A | * | 3/1985 | Johnson et al. | 251/30 X |
| 4,535,805 A | * | 8/1985 | Mertz | 251/30.01 X |
| 4,552,330 A | * | 11/1985 | Grotloh | 251/30.01 |
| 4,585,206 A |   | 4/1986 | Itoh | 251/30.02 |
| 5,133,382 A | * | 7/1992 | Nielsen | 251/30.02 X |
| 5,213,303 A | * | 5/1993 | Walker | 251/30.02 |
| 5,632,465 A | * | 5/1997 | Cordua | 251/30.02 X |
| 5,687,759 A |   | 11/1997 | Tan | 137/486 |
| 5,996,369 A | * | 12/1999 | Hirota | 251/118 X |
| 6,016,836 A | * | 1/2000 | Brunkhardt | 251/30.02 X |
| 6,058,955 A | * | 5/2000 | Griswold et al. | 251/30.01 X |
| 6,073,905 A | * | 6/2000 | Wilson | 251/30.02 X |

FOREIGN PATENT DOCUMENTS

EP          0 291 140          11/1988

* cited by examiner

*Primary Examiner*—Lesley D. Morris
*Assistant Examiner*—John Bastianelli
(74) *Attorney, Agent, or Firm*—Nilles & Nilles SC (57) ABSTRACT

A pilot operated flow regulating valve has pressure governing chamber receiving a moveable pressure receiving member for common movements together with a main valve member of the pilot operated flow regulating valve in relation to a fixed valve seat and by a differential pressure exerted to the pressure receiving member from both surface sides, further has a leak route of small cross-section extending between the pressure governing chamber and either the upstream or the downstream side of the valve seat, and has a constant differential pressure control valve for selectively either controlling the pressure inside the pressure governing chamber or for blocking a pilot route extending between the upstream and downstream sides.

8 Claims, 10 Drawing Sheets

PILOT OPERATED FLOW REGULATING VALVE

BACKGROUND OF THE INVENTION

The present invention relates to a pilot operated flow regulating valve. Such valves are used to regulate the flow of a fluid by maintaining a constant differential pressure between the upstream and the downstream side of the valve seat. Typical applications of said valves are; the regulation of the flow of heated pressurized water passing a pressure loss generating heat exchanger, regulation of the flow of refrigerant through an expansion valve in a refrigerating cycle using carbon dioxide as s refrigerant, regulation of the fuel rate through a controllable fuel injection valve for direct injection in an internal combustion engine, etc., i.e. applications where the fluid at least temporarily undergoes a great pressure differential.

Due to the fact that such valves when directly actuated by a solenoid would need a huge solenoid in case of a differential pressure of about 50 to 100 times the atmospheric pressure or more, instead pilot operated regulating valves are used in which the pilot valve only needs a small solenoid and actuates the main valve member by fluid pressure. Conventionally, in such pilot operated flow regulating valves a pilot route extends between the downstream side of the valve seat and the pressure governing chamber. The main valve member is opened and closed from the downstream side assisted by a constant pressure differential control valve actuated by said solenoid. The passage at the upstream side of the valve seat and the pressure governing chamber communicate with another via a leak route of small cross-section. However, the pressure governing chamber via said leak route then holds high pressure in relation to the downstream pressure when the pilot route is closed during main valve closing. Due to the high pressure differential fluid will then flow from pressure governing chamber to the downstream side through the pilot route and its vicinities and a flow larger than a certain degree always occurs inconveniently.

Furthermore, in a pilot operated flow regulating valve as known the initial fluid pressure does not act to generate a closing force at the main valve member in a state where the main valve member has reached its fully closed state so that a relatively strong spring is necessary to retain said fully closed state. Then, in order to open the main valve member again, an operating differential pressure stronger than the force of the spring must be produced. Said operating differential pressure reduces the fluid pressure as controlled by the flow regulating valve, because the valve does not respond unless the initial fluid pressure is sufficiently high to compensate said pressure loss and to overcome the force of the spring. This is an apparent shortcoming, particularly when the initial pressure of the fluid at the upstream side is low. The entire operable pressure range is limited.

OBJECTS AND SUMMARY OF THE INVENTION

It is an object of the invention to provide a pilot operated flow regulating valve of the kind as disclosed eliminating the drawbacks of conventional valves, such that the pilot operated flow regulating valve has an improved operational performance, does not need undesirable high differential pressure for response and eliminates the danger of undesirable leakage flows in the closed state. It is a part of said object to create a pilot operated flow regulating valve capable of definitely stopping a flow of fluid to the downstream side when the pilot route is closed, even though the upstream fluid pressure is high. Furthermore, a pilot operated flow regulating valve is to be provided having a good pressure efficiency and does not cause undesirable pressure losses in the fluid.

Said objects can be achieved with the features as contained in claim 1, in claim 2 and in claim 8.

The respective actuation of the constant differential pressure control valve is necessary, either to open or close the main valve member or to adjust its relative position at the valve seat for the desired constant fluid flow. This operational performance is achieved without an undesirable pressure loss, because the leak route allows to relieve the pressure in the pressure governing chamber sufficiently to open the main valve member without a significant pressure loss. Furthermore, since the constant differential pressure control valve selectively also can be brought in a blocking position the pilot route will be reliably blocked avoiding any undesired leak flow from the high pressure side to the low pressure side even in case of extreme high inlet pressure.

In the valve according to claim 2 the flow through the valve seat can reliably be controlled by controlling the constant differential pressure valve. Since the inside of the pressure governing chamber can have a low pressure as also the passage at the downstream side, no leakage flow occurs from the pressure governing chamber to the downstream side even though the pressure in the passage at the upstream side may be extremely high. Since also the pilot route can be blocked totally any flow of fluid to the downstream side can be stopped definitely.

For the valve as disclosed in claim 8 the pressure loss inevitably created by the heat exchanger can be utilised to operate the flow regulating valve. This is carried out by connecting the pressure governing chamber via the leak route with one of the fluid pipelines at the upstream or downstream side of the heat exchanger, while the constant differential pressure control valve is situated between the respective other pipeline and the pressure governing chamber. There is no undesirable pressure loss necessary for operating the flow regulating valve. A very reliable operation performance can be obtained even in a case where the initial fluid pressure at the upstream side is low. The flow regulating valve shows a good pressure efficiency without creating significant fluid pressure losses.

Preferred embodiments are contained in the depending claims.

BRIEF DESCRIPTION OF THE DRAWINGS

Embodiments of the invention will be explained with the help of drawings. In the drawings is.

DESCRIPTION OF THE PREFERRED EMBODIMENTS

The pilot operated flow regulating valves according to the present invention are mainly used when the valve has to be operated under a great differential pressure with a high pressure fluid. This can be the case for an expansion valve in a refrigerating cycle, e.g. using carbon dioxide as a refrigerant, for a direct injection fuel control valve for an internal combustion engine, or for a flow control valve for a high water pressure systems or the like.

Figure 1:
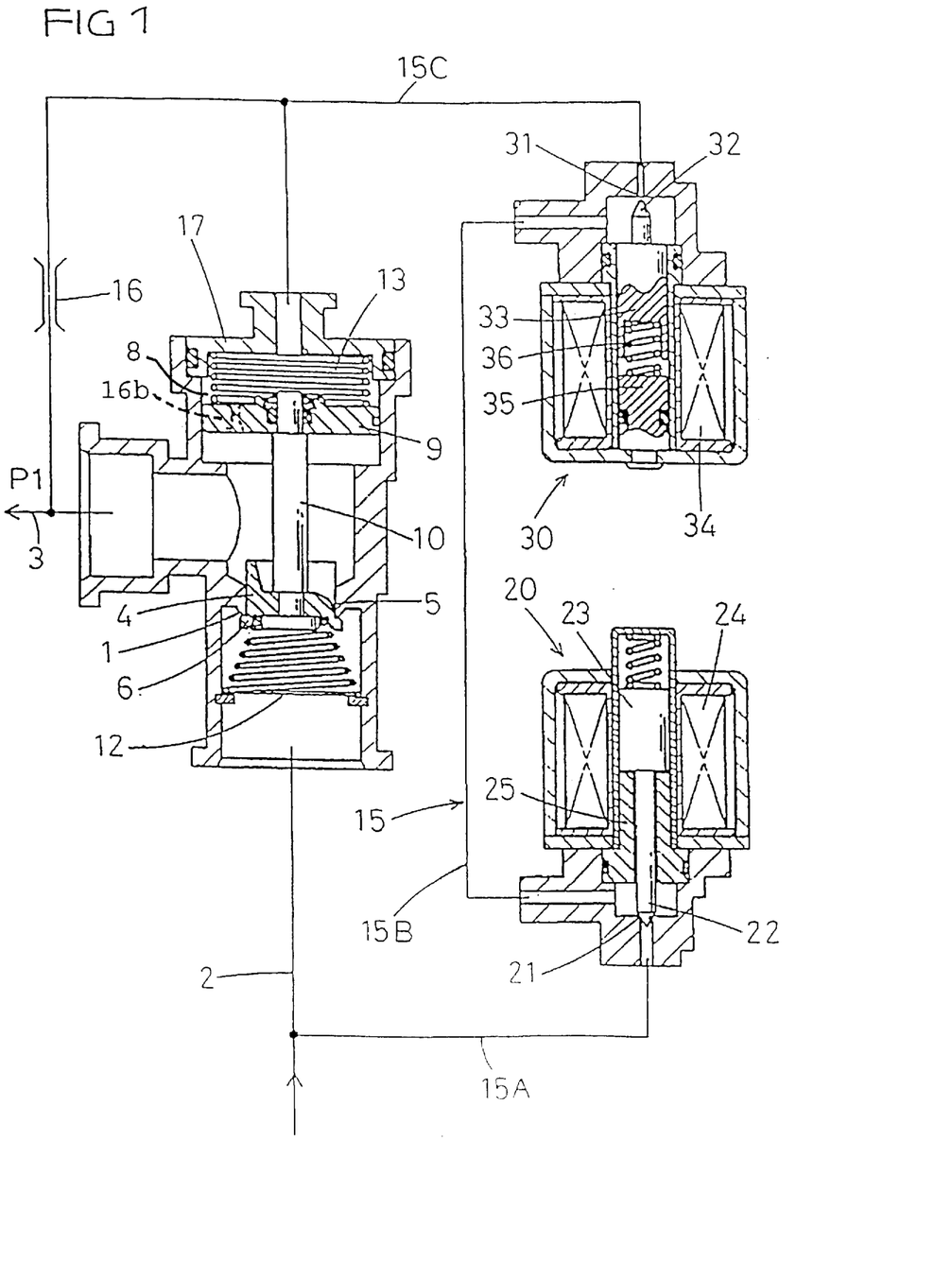
FIG. 1 A longitudinal section of a pilot operated flow regulating valve (first embodiment), FIGS. 2 and 3 Longitudinal sections of a further embodiment in an open state and in a fully closed state, respectively, FIG. 4 A block diagram and longitudinal section of a further embodiment, FIG. 5 The embodiment of FIG. 4 with modified piping, FIG. 6 A longitudinal section of another embodiment, FIG. 7 A longitudinal section of a further embodiment, FIG. 8 A schematic illustration of a combination of two flow regulating valves switched in parallel, both being of the kind as shown in FIG. 6, FIG. 9 A longitudinal section of a further embodiment, and FIG. 10 A longitudinal section of a further embodiment of a flow regulating valve.

The embodiment of the pilot operated flow regulating valve as shown in FIG. 1 has a ring-shaped valve seat 1 formed in the middle of a pipeline containing high pressure fluid, e.g. with a pressure of 50 to 100 times the atmospheric pressure or more. A pipeline 2 is provided at the upstream side of valve seat 1, while a pipeline 3 is provided at the downstream side of said valve seat 1. Valve seat 1 is formed within pipeline 2 at the upstream side. A main valve member 4 is provided having a cylindrical shape with an end face which is closed at the upstream side and is arranged by insertion and fitting in the valve seat 1 in a freely moveable manner in the direction of its longitudinal axis. On a side wall surface of said main valve member 4 a slit 5 can be provided for flow regulation. At the upstream side of main valve member 4 a stop valve portion 6 is formed as a flange-shaped projection. As soon as stop valve portion 6 is pressed against valve seat 1, the valve has its fully closed state, as shown.

From pipeline 3 at the downstream side a cylindrical pressure governing chamber 8 is branching off. Pressure governing chamber 8 has a diameter larger than valve seat 1. A piston or disk-shaped pressure receiving member 9 is inserted in a axially freely moveable manner into pressure governing chamber 8. In this embodiment pressure governing chamber 8 is closed by an exterior bulk head 17. Pressure receiving member 9 is coupled to main valve member 4 into a united body by a coupling member in the form of a connecting rod 10 extending in the axial direction of pressure governing chamber 8. Main valve member 4 and pressure receiving member 9 have to move simultaneously in relation to valve seat 1. Compression coil springs 12, 13 are provided to prevent rattling of main valve member 4 and pressure receiving member 9.

Main valve member 4 is receiving pressure in pipeline 2 (upstream side) on one surface and pressure in pipeline 3 (downstream side) on the opposite surface. Pressure receiving member 9 is receiving pressure pilot or pressure in pressure governing chamber 8 at its upper surface and also the pressure in pipeline 3 (downstream side) at its opposite surface. Pressure governing chamber 8 is communicating with the downstream side either (as shown) via a leak route 16 of small cross-section provided in a branch pilot line or directly (indicated by dotted lines) via a leak aperture 16b in pressure receiving member 9 directly.

The pressure receiving or cross-sectional area of pressure governing chamber 8 and pressure receiving member 9, respectively, is bigger (e.g. 2 to 10 times bigger) than the pressure receiving area or cross-sectional area of valve seat 1. Therefore, by controlling the pilot pressure in pressure governing chamber 8 the state of main valve member 4 between its opened and closed positions is controlled by means of pressure receiving member 9 and coupling member or connecting rod 10.

A pilot route 15 extends from the upstream side of pipeline 2 to pressure governing chamber 8 and is bypassing valve seat 1. Within pilot route 15 a constant differential pressure control valve 20 for the pilot route 15 and, optionally, a shut-off valve 30 are arranged in series. Pilot route 15 consists of three portions 15A, 15B, 15C among which portion 15A is connecting said upstream side with the inlet of constant differential pressure control valve 20; portion 15B is interconnecting a valve seat 21 of said constant differential pressure control valve 20 and a valve seat 31 of shut-off valve 30; and portion C is connecting valve seat 31 with the downstream side. The cross-sectional area of pilot route 15 is preferably larger than the cross-sectional area of leak route 16.

Shut-off valve 30 is electromagnetically actuated in order to simply open or shut the pilot line by means of a shut-off valve body 32 co-acting with valve seat 31. Within pilot shut-off valve 30 a moveable iron core 33 is carrying valve body 32. Moveable iron core 33 is arranged to co-operate with fixed iron core 35. A valve closure spring 36 (compression coil spring) is interposed between both iron cores 33, 35. Electromagnetic coil 34 serves to attract moveable iron core 33 via fixed iron core 35 counter to the closing force of closure spring 36 and to open said shut-off valve 30. Without exciting current for electromagnetic coil 34 said closure spring 36 is maintaining shut-off valve 30 in its closed state. As follows, this embodiment will be described when said shut-off valve 30 is in its open state (electromagnetic coil 34 excited).

Said constant differential pressure control valve 20 is also an electromagnetically actuated differential pressure valve with a conical pilot valve body 22 arranged at the downstream side of pilot valve seat 21. Pilot valve body 22 is coupled to a moveable iron core 23 which is drivable by an electromagnetic coil towards fixed iron core 25 by the magnetic field as soon as electromagnetic coil 24 is excited. Current on electromagnetic coil 24 is creating a closing force for pilot valve body 22 in relation to valve seat 21. The magnitude of said closing force is adjusted by the current supplied to electromagnetic coil 24.

When the value of a current supplied to electromagnetic coil 24 is maintained constant, pilot valve body 22 opens as soon as the differential pressure between the upstream side and the downstream side of pilot valve seat 21 (that is the differential pressure between the inlet and the outlet of pilot route 15) is exceeding the force created by the constant current value. Pilot valve body 22 is closing as soon as the differential pressure becomes smaller than the force created by said constant current value. In this way the differential pressure between the inlet and the outlet of the pilot route 15 is maintained constant. By varying or selecting the value of the current supplied to electromagnetic coil 24 of valve 20 the differential pressure value between the inlet and the outlet of the pilot route can be controlled arbitrarily. The differential pressure value is a minimum in a state where there is no current supplied to electromagnetic coil 24. To the contrary, if maximum current is supplied to electromagnetic coil 24, the connection between the inlet and the outlet of pilot route 15 is blocked.

The pilot pressure in pressure governing chamber 8 corresponds to the pressure at the outlet of pilot route 15. As, by constant differential pressure control valve 20, the differential pressure between the upstream side and said pressure governing chamber 8 can be kept constant, thereby the opening state of main valve member 4 is controlled as well as the flow of the pressure fluid flowing from pipeline 2 at the upstream side to pipeline 3 at the downstream side. As a consequence, said flow can also be kept constant. By changing the value of the current supplied to the electromagnetic coil 24 the flow from pipeline 2 to pipeline 3 can be controlled arbitrarily.

In case that in the pilot operated flow regulating valve as described the current value for electromagnetic coil 34 of said shut-off valve 30 is set to OFF (no current) said shut-off valve is blocking pilot route 15 by means of closure spring 36. Pressure governing chamber 8 then communicates via leak route 16 with the downstream side or pipeline 3 so that the pilot pressure in governing chamber 8 finally is the same low pressure P1 as in pipeline 3 at the downstream side.

Due to the differential pressure between pressure P1 at the downstream side and the high pressure in pipeline 2 at the upstream side stop valve portion 6 of main valve member 4 is pushed against valve seat 1. Main valve member 4 is set to a fully closed state. Since pressure governing chamber 8 has the same low pressure P1 as pipeline 3 at the downstream side, no leak flow can occur from pressure governing chamber 8 into pipeline 3 even though the pressure in pipeline 2 at the upstream side may be very high. A stable zero state of flow can be obtained.

Figure 2:
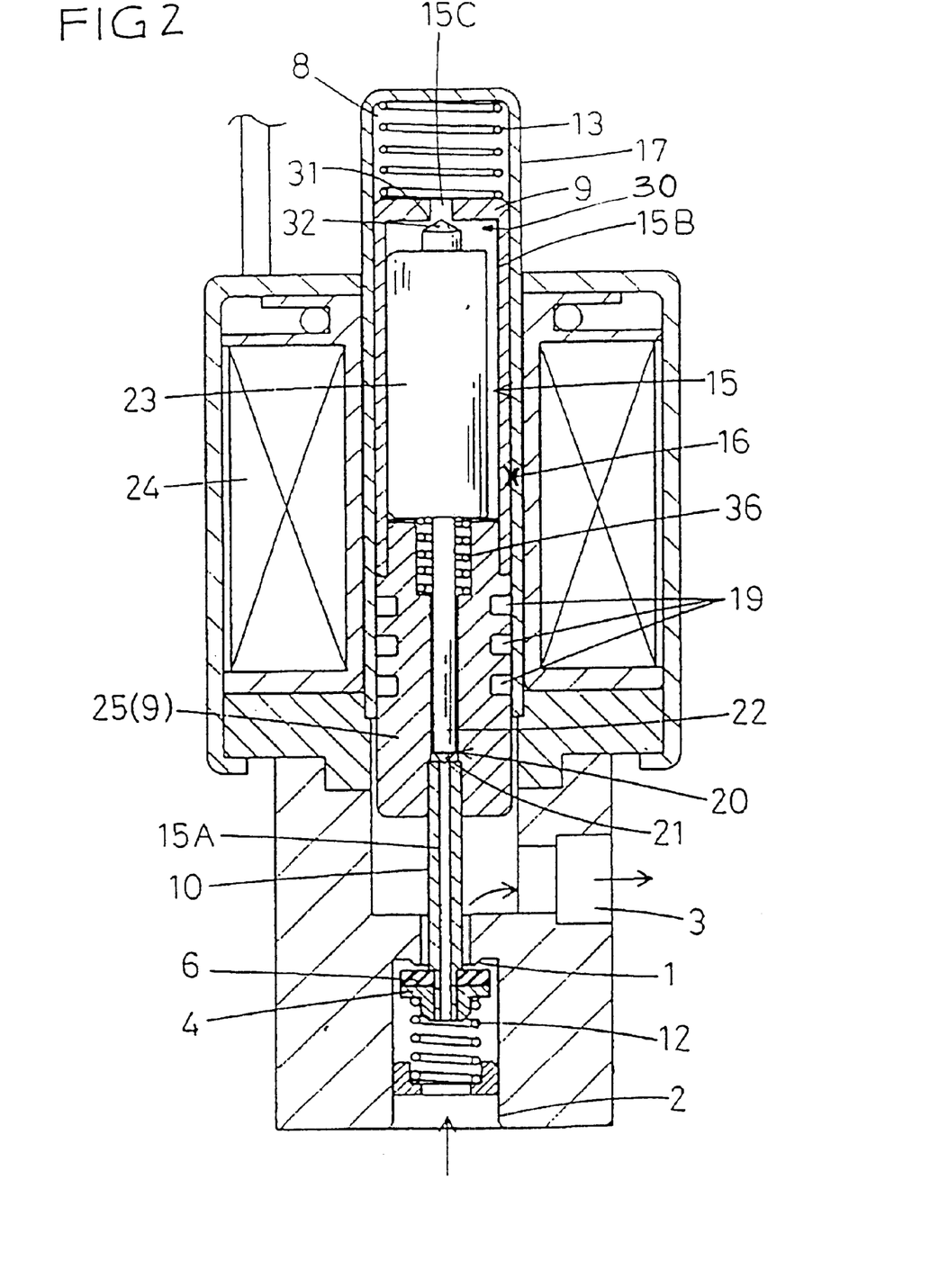

In the further embodiment of FIG. 2 pilot route 15 is formed in the interior of said flow regulating valve, namely by an axially through bore formed in coupling member or connecting rod 10 from the lower side of main valve member 4 to valve seat 21 provided at the upper end of said through bore (portion 15A), furthermore, by an inner bore of fixed iron core 25, a flow passage between the periphery of moveable iron core 23 and sleeve-shaped pressure receiving member 9 fixedly connected to fixed iron core 25 (portion 15B), and by a bore in the top portion of pressure receiving member 9 leading into pressure governing chamber 8 (portion 15C). Pilot valve body 22 of constant differential pressure control valve 20 provided within said pilot route 15 is constituted by a rod with a lower conical end seated with clearance within the bore of fixed iron core 25 and being actuatable by moveable iron core 23. The electromagnetic coil 24 for attracting moveable iron core 23 via fixed iron core 25 is disposed externally so as so surround the above-mentioned components. Shut-off valve 30 is constituted by valve seat 31 in the bore of the top portion of pressure receiving member 9 and shut-off valve body 32 protruding from the upper end of moveable iron core 23 towards valve seat 31. Rattling preventing springs 12, 13 are received in pressure governing chamber 8 and below main valve member 4, respectively. In this embodiment moveable iron core 23 as well as electromagnetic coil 24 also serve to actuate shut-off valve 30 to either adjust the closed or opened state of shut-off valve 30. Pressure governing chamber 8 is closed by a pot-shaped cover 17 defining a partition wall firmly secured to the carrying structure of the electromagnetic coil 24 such that all moveable components are received therein. Leak route 16 with small cross-section is constituted between the outer periphery of pressure receiving member 9 and the inner side of partition wall 17 and extends over several circumferential grooves 19 of fixed iron core 25 (three circumferential grooves formed in the outer peripheral surface of fixed iron core 25 in order to reduce a possible pressure loss in leak route 16 defined by the clearance between fixed iron core 25 and outer partition wall 17 of cylindrical shape with a closed tip portion).

Main valve member 4 is located opposite to pipeline 2 at the upstream side of valve seat 1. Stop valve portion 6 in this case a disk-shaped rubber part. Pressure receiving member 9 and fixed iron core 25 are coupled together in a united body which is freely axially moveable. Since the pilot pressure and pressure governing chamber 8 is acting on the upper end surface of pressure receiving member 9, while the pressure in pipeline 3 at the downstream side is acting at the lower end surface of fixed iron core 25, fixed iron core 25 also becomes part of pressure receiving member 9 (fixed iron core 25 constitutes one half of pressure receiving member 9).

The pressure receiving cross-sectional area of pressure receiving member 9 (and its iron core 25) is bigger than the cross-sectional area of valve seat 1 (e.g. about 2 to 10 times bigger). When current is supplied to electromagnetic coil 24 moveable iron core 23 is attracted to fixed iron core 25 so that pilot valve body 22 is pressed with a corresponding force against pilot valve seat 21. If said current supplied to electromagnetic coil 24 is constant, pilot valve body 22 will be opened as soon as the differential pressure between the upstream side and the downstream side of pilot valve seat 21 is exceeding a certain value. As soon as said differential pressure is decreasing below said value, said pilot valve body 22 will reach a closed state. In this way the differential pressure between the inlet and the outlet of the pilot route 15 can be kept constant. Since the pressure in pressure governing chamber 8 is the outlet pressure of pilot route 15, the differential pressure between pipeline 2 at the upstream side and the pressure in pressure governing chamber 8 can be held constant so that the opening state of main valve member 4 is controlled and the flow of the pressure fluid from pipeline 2 into pipeline 3 can be controlled to be constant.

By varying the current value applied to electromagnetic coil 24 the flow of the pressure fluid from pipeline 2 to pipeline 3 can be controlled arbitrarily.

Figure 3:
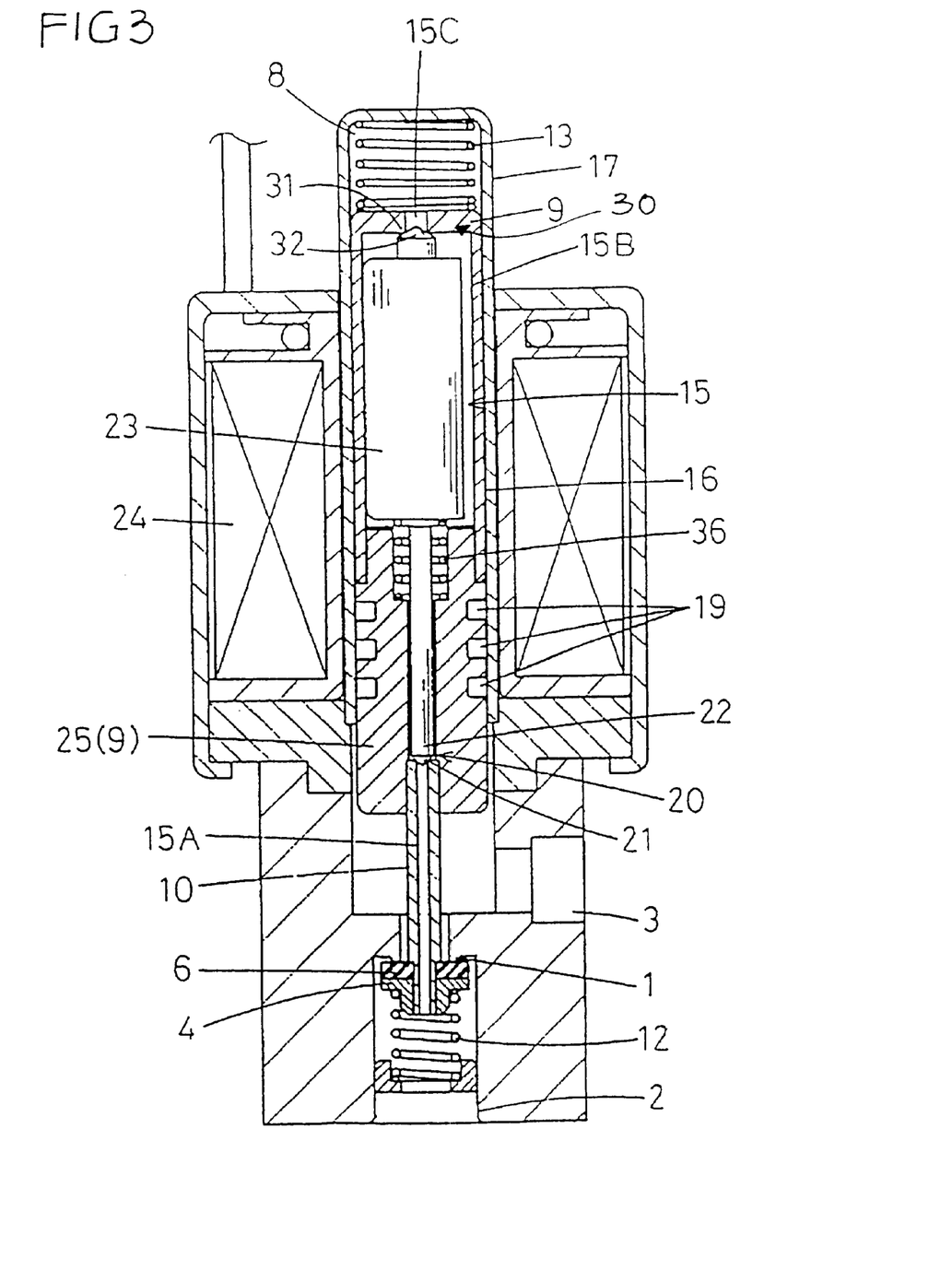

If the current value for electromagnetic coil 24 is set to OFF (zero current), spring 36 provided between fixed iron core 25 and moveable iron core 23 will push moveable iron core 23 upwardly (FIG. 3), so that shut-off valve body 32 will be pressed against seat 31 and pilot route 15 will be blocked. At that time the pressure inside pressure governing chamber 8 will reach the pressure in pipeline 3 at the downstream side via leak route 16. Since then the pressure in governing chamber 8 will be the same as in pipeline 3, no leak flow can occur from pressure governing chamber 8 into pipeline 3, and a completely zero flow state can be obtained stably, even if the pressure inside pipeline 2 at the upstream side is very high.

Figure 4:
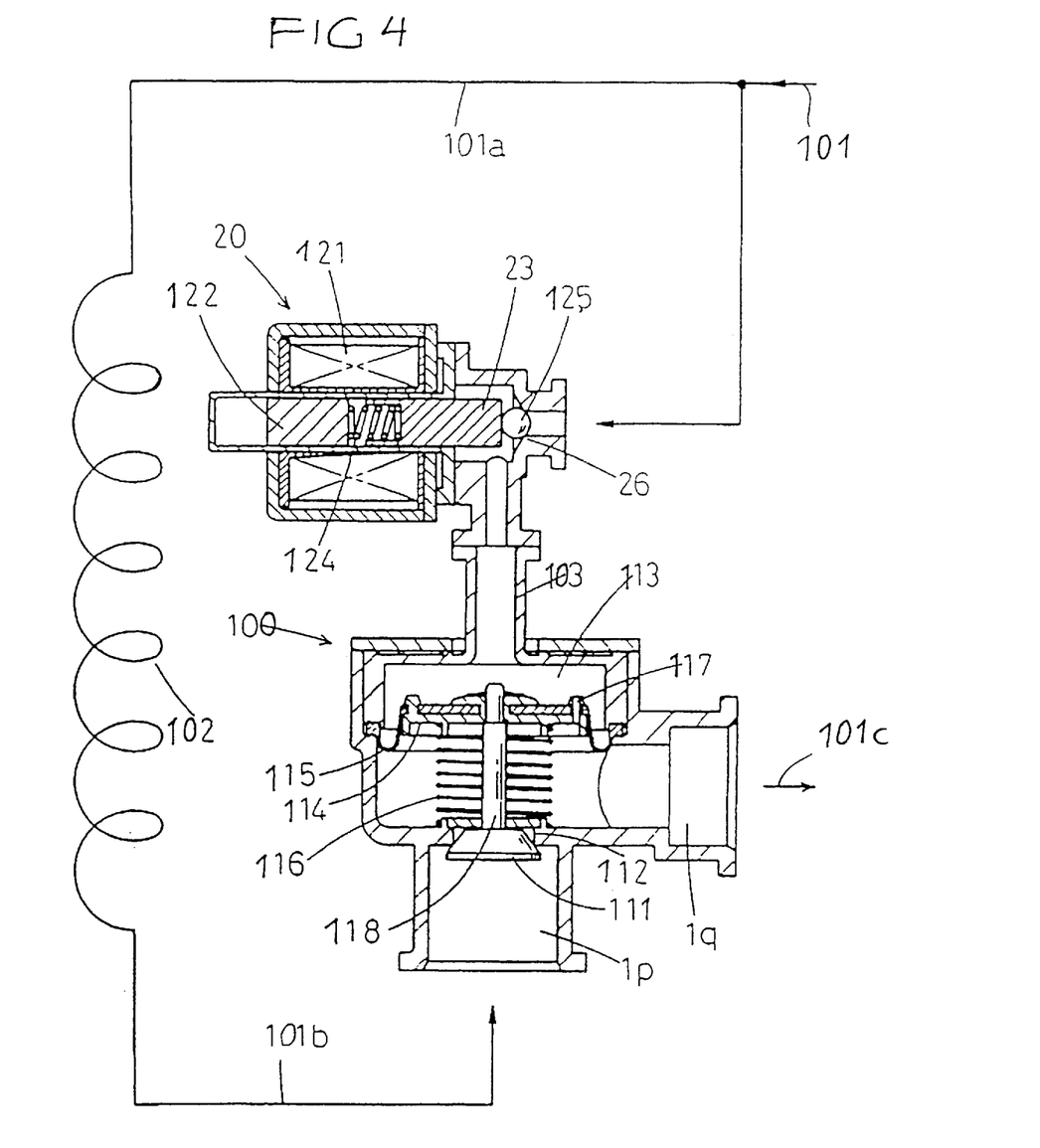

In the embodiment of FIG. 4 pilot operated flow regulating valve 100 is provided within a fluid pipeline 101 of a hot water supply equipment containing a heat exchanger 102 heated by a not shown heat source. Since heat exchanger 102 contains a long passage of relatively small cross-section a pressure loss unavoidably occurs in the fluid passing fluid pipeline 1, i.e. a pressure difference occurs between portion 101*a* and portion 101*b* interconnected by heat exchanger 102. Said flow regulating valve 100 is provided between portion 101*b* and a downstream portion 101*c* of pipeline 101. The pressure difference generated by heat exchanger 102 might amount e.g. to about 0.2 to 0.5 kg/cm$^2$, e.g.. Portion 101*b* of fluid pipeline 101 extends to the lower surface of main valve member 111 situated opposite to valve seat 112 from the upstream side to open and close fluid pipeline 101. In valve housing a passage of portion 101*b* is called upstream portion 1*p* of the flow regulating valve 10, while the passage leading into portion 101*c* is called the downstream portion 1*q*.

Pressure governing chamber 113 is branching off from downstream portion 1*q*. Moveable pressure receiving member 114 (a hard disk) is combined with a flexible diaphragm 115, both separating pressure governing chamber 113 from downstream portion 1q. Downstream portion 1q and pressure governing chamber 113 are connected by leak route 117 provided in pressure receiving member 114, 115 said leak route 117 having a small cross-sectional area. Main valve member 111 is unified with pressure receiving member 114, 115 by coupling member 118 extending axially in relation to valve seat 112. Compression coil spring 116 assists in closing main valve member 111. Compression coil spring 116 is seated in the valve housing around valve seat 112 and constantly is urging pressure receiving member 114, 115 in closing direction of main valve member 111. As a consequence, fluid pressure in portion 101b (in upstream portion 1p) and the force of compression coil spring 116 act together in closing direction of main valve member 111. Since the cross-sectional area of pressure receiving member 114, 115 is made bigger than the cross-sectional area of valve seat 112, also the pressure in upstream portion 1q is generating a force component in closing direction of main valve member 111. The fluid pressure inside pressure governing chamber 13, however, is acting in the opening direction of main valve member 111. Due to this arrangement main valve member 111 is able to maintain any position in which said forces are balanced.

Pressure governing chamber 113 is connected to pipeline portion 101a (upstream side) by a pilot route 103. In pilot route 103 constant differential pressure control valve 20 is installed. Said constant differential pressure control valve 20 is driven electromagnetically in order to adjust a constant differential pressure. Pilot route 103 is formed with a cross-sectional area bigger than that of leak route 117. A compression coil spring 124 for generating a differential pressure is arranged between fixed iron core 122 and is pushing spherical pilot valve body 125 towards valve seat 26 in a direct on from the low pressure side to the high pressure side (i.e., from the side of pressure governing chamber 113 to the side of portion 101 a of pipeline 101 (upstream side).

When no electric current is supplied to electromagnetic coil 121, pilot valve body 125 is strongly pressed against valve seat 26 by the force of compression coil spring 124 for the differential pressure, and pilot route 103 then is blocked. In this state pressure governing chamber 113 has a pressure equal to the pressure at the downstream portion 1q, namely via leak route 117. Main valve member 111 is pushed against valve seat 112 only by compression spring 116 so that the closed state of main valve member 111 is created.

As soon as electric current is supplied to electromagnetic coil 121, the force of spring 124 acting on pilot valve body 125 is decreasing as magnetic force is produced. Pilot valve body 125 gets separated from valve seat 26 by the differential pressure between portion 101a of pipeline 101 at the upstream side and the fluid pressure in pressure governing chamber 113. The differential pressure between portion 101a at the upstream side and the pressure in governing chamber 113 is balanced with the residual force applied to pilot valve body 125 and said differential pressure is maintained at a constant level corresponding to the current value applied to electromagnetic 121. Actually, with increasing current, the pressure in pressure governing chamber 113 will be close to pressure in portion 101a of pipeline 101 at the upstream side.

The fluid pressure in portion 101b of the pipeline is lower by a constant pressure drop than in portion 101a at the upstream side due to the pressure loss in heat exchanger 102. Pressure receiving member 114, 115 moves in response to the control of the constant differential pressure control valve 20 so that main valve member 111 is separated from valve seat 112 and flow regulating valve 100 reaches an open valve state by which the flow of the fluid entering into portion 101c is controlled to a constant level. As a consequence, the pressure loss inevitably caused by heat exchanger 102 can be utilised even for the operation of flow regulating valve 100. As a result, no additional pressure loss for operating flow regulating valve 100 can occur so that its flow control can be performed definitely even in a environment where the initial pressure at the upstream side of fluid pipeline 101 is low.

Figure 5:
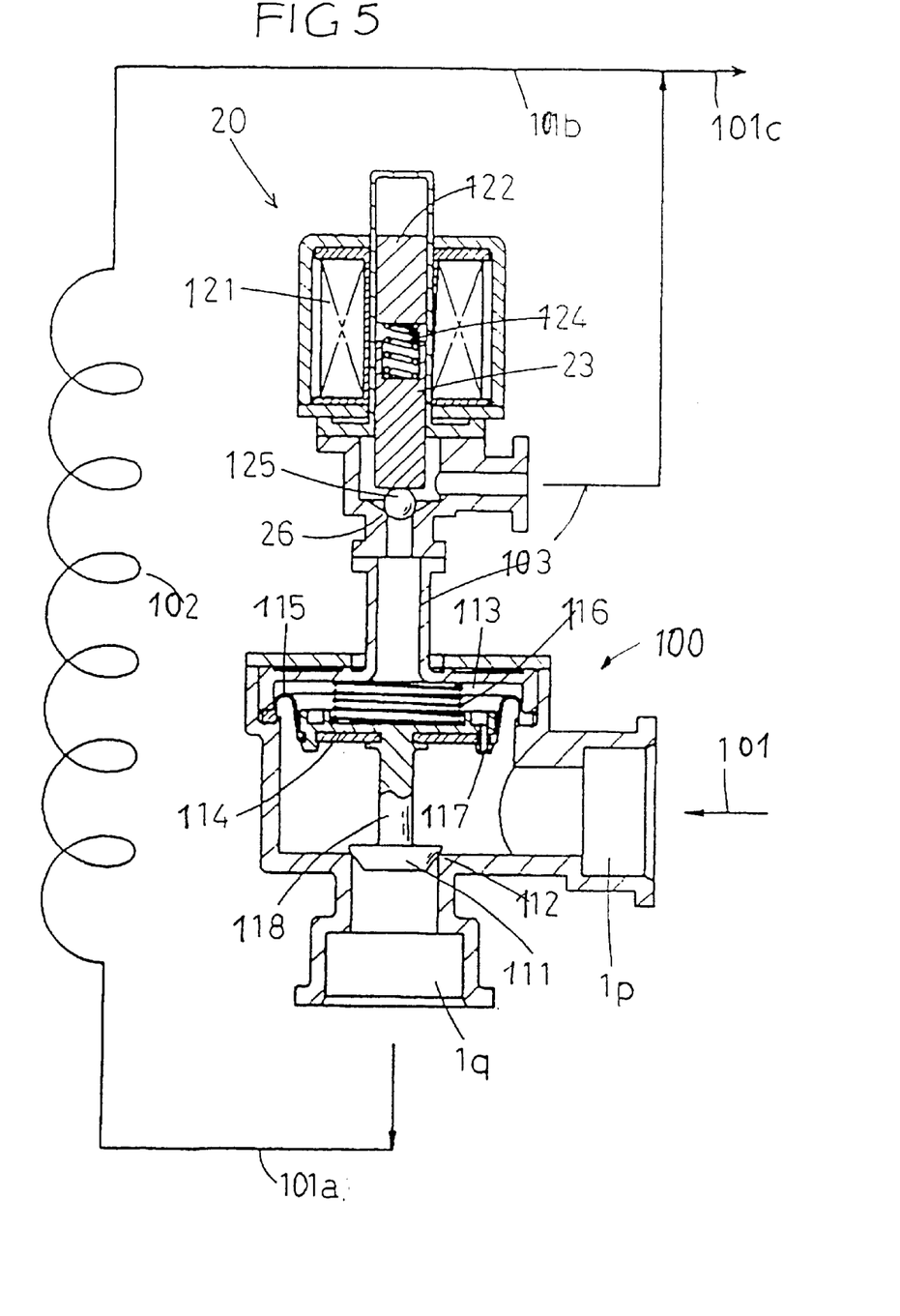

In the embodiment of FIG. 5 pilot operated flow regulating valve 100 is arranged reversely to the arrangement of FIG. 4, as said flow regulating valve 100 is connected to the portion 101a at the upstream side of heat exchanger 102. Constant differential pressure control valve 20 is connected in series between the downstream portion 101b at the downstream side of heat exchanger 102 and pressure governing chamber 113.

Since the flow direction here is reversed the compression coil spring 116 for closing the main valve member 111 is arranged inside pressure governing chamber 113, upstream portion 1p of the housing is arranged at the lower side of pressure receiving member 114,115, and finally main valve member 111 is facing valve seat 112 from the upper side and from the inside of portion 1p. Portion 101a of pipeline 101 is connected to portion 1q of the housing downstream of main valve member 111.

In pilot route 103 pilot valve body 125 is facing valve seat 26 from the side of downstream pipeline portion 101b. The arrangement of the further components corresponds to the former embodiment. The operation and the effects of the valve 100 are the same as in the embodiment of FIG. 4.

Pilot route 103 with constant differential pressure control valve 20 is constituting a relief connection into downstream portion 101c of pipeline 101 for the pressure fluid which enters pressure governing chamber 113 via leak route 117 from the high pressure upstream pipeline 101 in portion 1p. As soon as moveable iron core 123 is attracted to fixed iron core 122 via the current supplied to electromagnetic coil 121, the opening state of valve 100 for the necessary flow is achieved due to the pressure drop in leak route 117 across pressure receiving member 114,115. When electromagnetic coil 121 is not excited, spring 124 is closing valve 125, 26 by means of moveable iron core 23. Then spring 116 is pushing main valve member 111 against valve seat 112 into the closed state.

Figure 6:
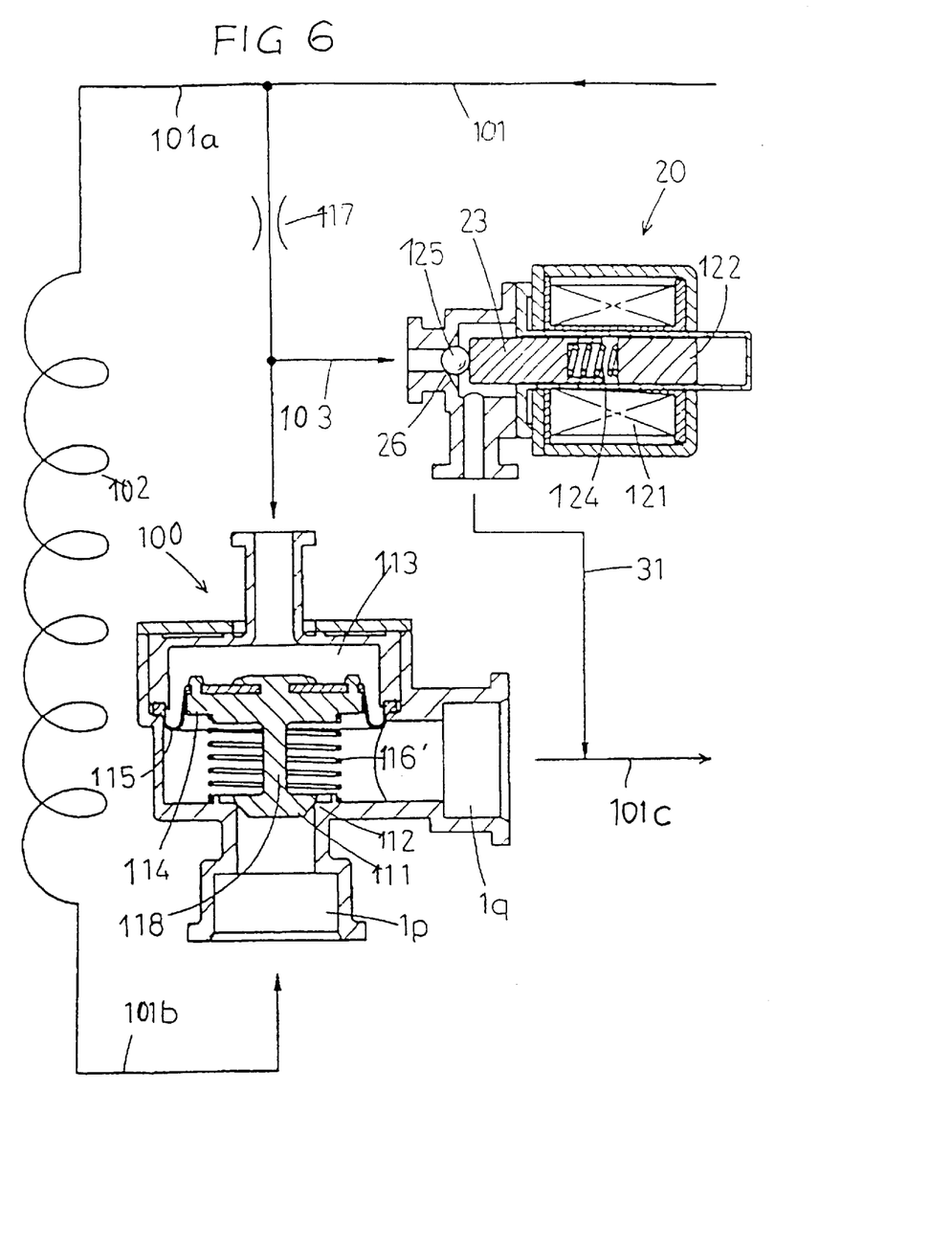

In the embodiment of FIG. 6 pilot operated flow regulating valve 100 is arranged similarly as in FIG. 4 at the downstream side of heat exchanger 102 and between portions 101b and 101c of pipeline 101. Leak route 117 extends from upstream side portion 101a to pressure governing chamber 113 in the form of a branch pilot line with a throttling aperture of small cross-section. Constant differential pressure control valve 20 is arranged between said branch pilot line downstream of said aperture and portion 101c of pipeline 101, i.e. between pressure governing chamber 113 and portion 1q. Main valve member 111 is facing valve seat 112 from the downstream side, i.e. from the side of portion 1q. Compression coil spring 116' in this case serves to load main valve member 111 via pressure receiving member 114, 115 and coupling member 118 in opening direction. The other components are similarly arranged as in FIG. 4.

When no current is supplied to electromagnetic coil 121 the pressure inside pressure governing chamber 113 becomes equal to the pressure in portion 101a of pipeline 101, namely via leak route 117, and then is higher than the pressure in portion 101b of pipeline 101. Main valve member 111 is pushed against valve seat 112 by the force created by moveable pressure receiving member 114, 115 and the closed valve state occurs.

When current is supplied to electromagnetic coil 21 such that the actuating force for pilot valve body 125 is decreasing, the pressure in pressure governing chamber 113 will be controlled by a constant differential pressure to the pressure in downstream portion 1q. Main valve member 111 is opened by the balance between the differential pressure applied to both surfaces of moveable pressure receiving member 114, 115 and the force of compression coil spring 116'. As a consequence, the flow of the fluid passing flow regulating valve 100 is controlled to a constant level.

With this embodiment no undesirable pressure loss for operating the flow regulating valve 100 can occur, since the full closing force for main valve member 111 is obtained by using the pressure loss inevitably occurring by the flow through heat exchanger 102. This means that a definite valve operation can be achieved even under conditions where the initial pressure at the upstream side of fluid pipe 101 is low.

Figure 7:
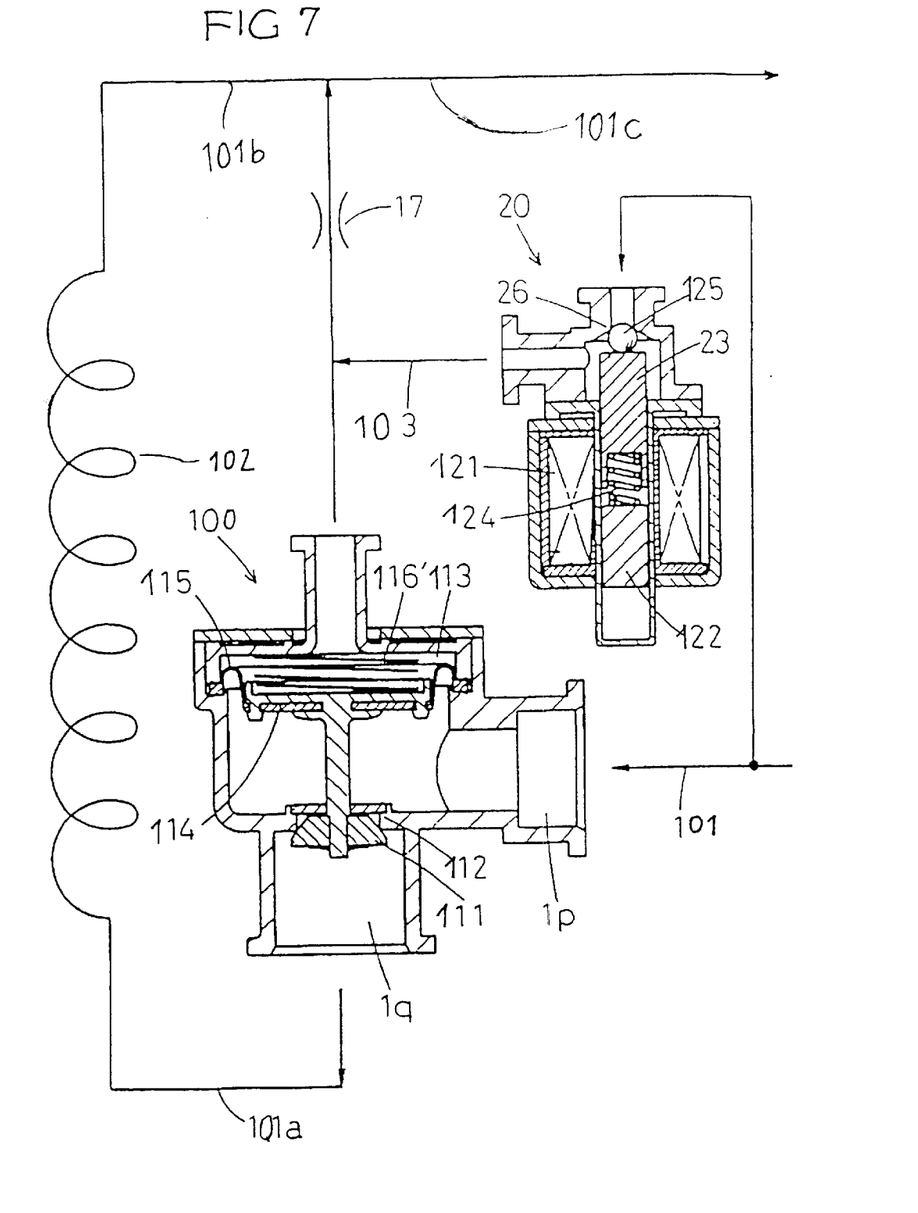

In the embodiment of FIG. 7 the flow regulating valve 100 is arranged reversed compared to the arrangement of FIG. 6, i.e. valve seat 112 is located between upstream pipeline 101 and portion 101a upstream of heat exchanger 102. Leak route 117 is provided between downstream portion 101b of pipeline 101 (downstream side of heat exchanger 102) and pressure governing chamber 113. Constant differential pressure control valve 20 is provided in pilot route 103 connecting high pressure upstream pipeline 101 with pressure governing chamber 113 which contains coil spring 116' acting in opening direction of main valve member 111. Main valve member 111 is facing valve seat 112 from the downstream side in portion 1q. Pilot valve body 125 is facing valve seat 26 at the downstream side of pilot route 103 or from the side of the pressure governing chamber 113, respectively. The arrangement of the other components is as in the embodiment of FIG. 6. The same operation and the same effect can be obtained.

Figure 8:
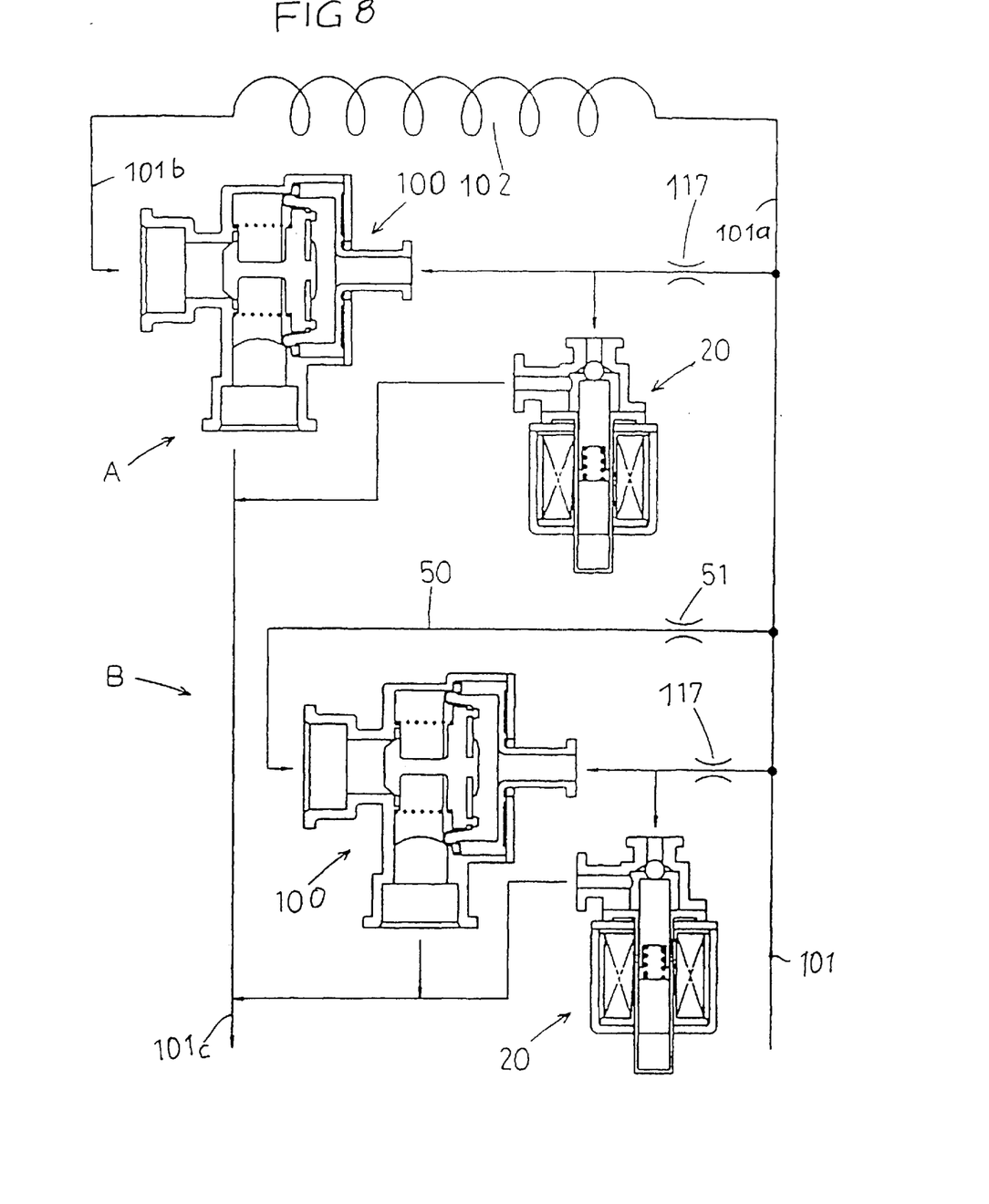

In the embodiment of FIG. 8 pilot operated flow regulating valve 100, A of the embodiment of FIG. 6 is combined with a second pilot operated flow regulating valve B (100) in parallel. The arrangement of said second pilot operated flow regulating valve B corresponds to the arrangement as shown in FIG. 6. Both pilot operated flow regulating valves A, B serve to adjust different flows of the fluid between high pressure pipeline 101 and the portion 101c, e.g. so that pilot operated flow regulating valve A regulates the flow through heat exchanger 102, while second pilot operated flow valve B regulates the flow of fluid bypassing heat exchanger 102 (e.g. hot and cold water).

Second pilot operated flow regulating valve B is connected to a bypass pipeline 50 not passing heat exchanger 102 in order to perform flow control for cold water. In a position corresponding to the position of the heat exchanger 102 in the arrangement for pilot operated flow regulating valve A a passage 51 for throttling is provided, creating a pressure loss which is at least approximately the same as the pressure loss inevitably generated by heat exchanger 102.

In this case both pilot operated flow regulating valves A, B are applied to both the hot water and cold water systems of a hot water supply equipment for controlling the mixing ratio of hot water and cold water as well as the respective flows or flow rates. In the embodiment as shown, the pilot operated flow regulating valves A, B correspond to the embodiment as shown in FIG. 6. However, instead also any other type as shown may be applied.

Figure 9:
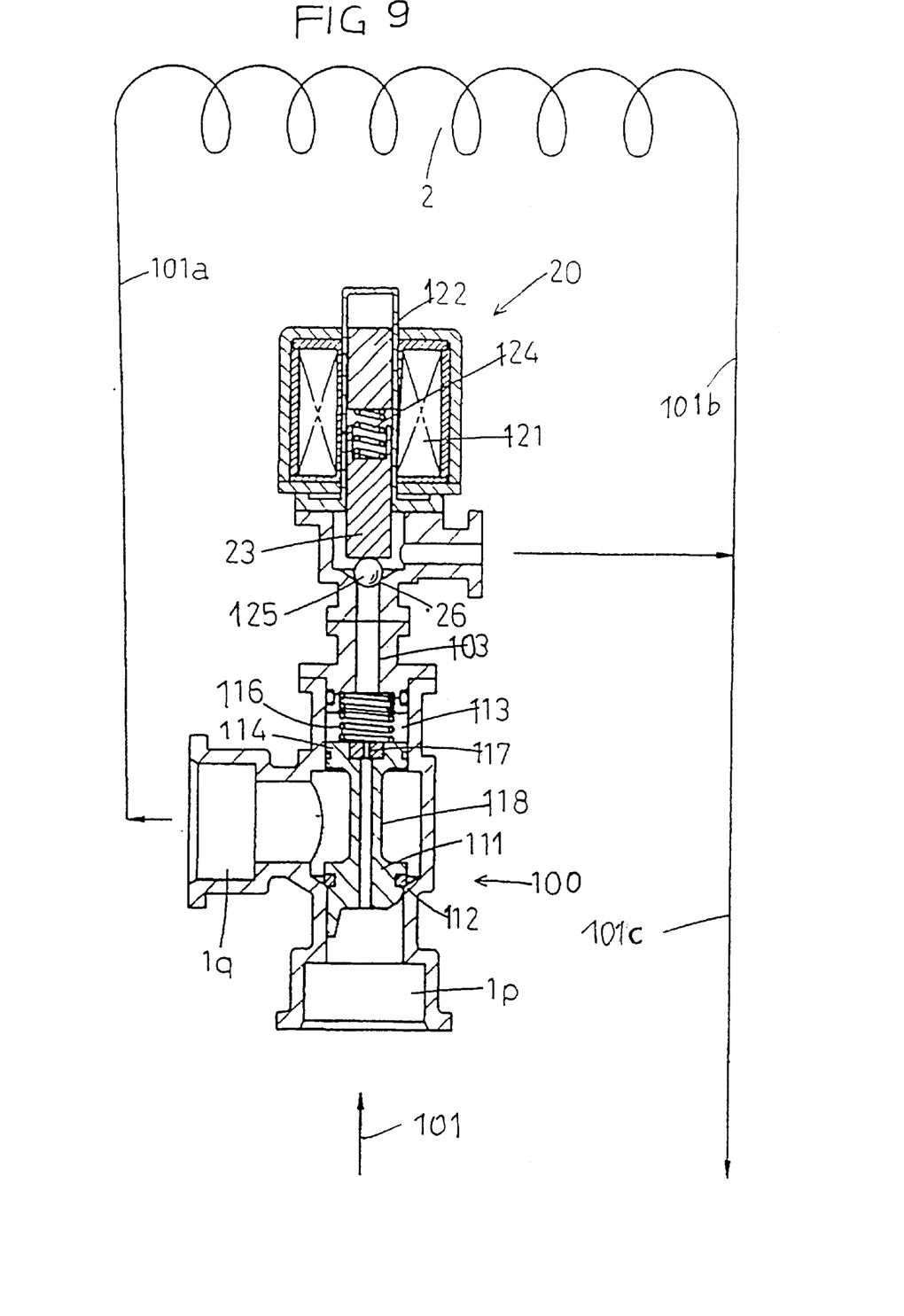

In the embodiment of FIG. 9 the pilot operated flow regulating valve 100 is designed similar to the one shown in FIG. 5. However, the upstream portion 1p and the downstream portion 1q are arranged reversely, i.e. main valve member 111 faces valve seat 112 from the downstream side in portion 1q. Leak route 117 is formed by a through bore of coupling member 118 leading from portion 1p via a throttling aperture directly into pressure governing chamber 113 which houses closure spring 116. Moveable pressure receiving member 114 has a piston shape and is fitted into pressure governing chamber 113 without a diaphragm. In this embodiment the pressure actuated surface of pressure receiving member 114 is approximately equal to the pressure receiving surface area of valve seat 112. Pilot route 103 extends between pressure governing chamber 113 and portion 101b of pipeline 101 and contains electromagnetically actuated constant differential pressure control valve 20 serving as a control relief valve for the pressure built up in pressure governing chamber 113 via leak route 117.

Figure 10:
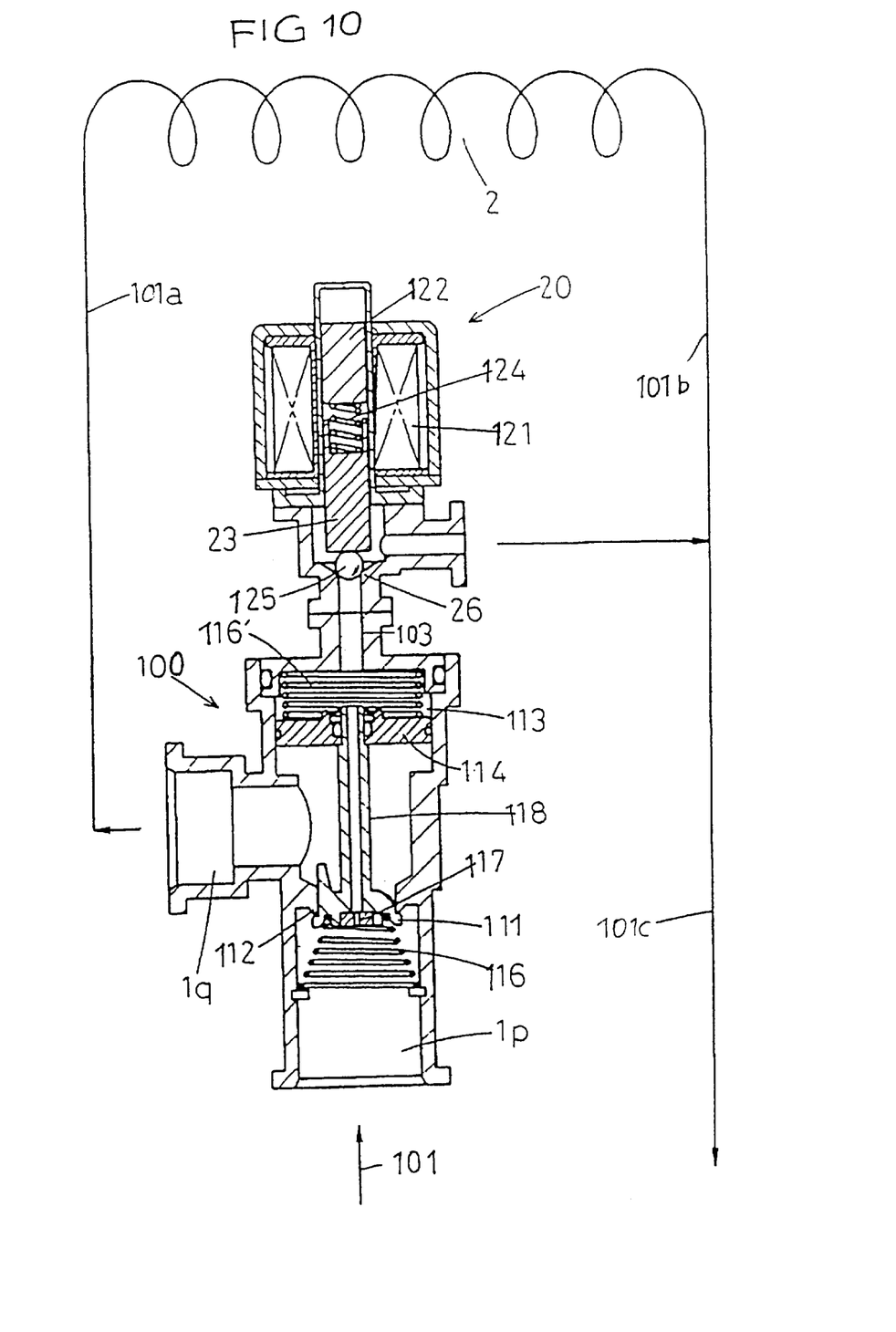

In the embodiment of FIG. 10 again the arrangement of the pilot operated flow regulating valve 100 is reversed in comparison to the embodiment of FIG. 9. Main valve member 111 opens as soon as constant differential pressure control valve 20 in pilot route 103 is closed. As soon as constant differential pressure control valve 20 is opened, the degree of opening of main valve member 111 gradually is decreasing.

The application of the pilot operated flow regulating valves as shown in FIGS. 4 to 10 is not limited to the hot water supply equipment. Instead said different embodiments as well can be applied to the flow control of refrigerant in a refrigerating cycle and other various kinds of equipment.

Basically in the embodiments of FIGS. 4 to 10, a pressure loss inevitably created by a heat exchanger or a similar pressure drop generating device is utilised for the operation of the flow regulating valve having the outline as shown. The main advantage of said arrangement is that no pressure loss will occur for the operation of the flow regulating valve. To the contrary, a very reliable operational behaviour can be obtained even in case that the initial pressure of the high pressure fluid at the upstream side is low.

What is claimed is:

1. A pilot operated flow regulating valve, comprising:
   a main valve member arranged in the vicinity of a valve seat such that a closed state occurs when the mail valve member at the valve seat formed in a passage supplying high pressure fluid is contacted by the high pressure fluid from an upstream side;
   a pressure governing chamber formed as a branch from a passage at a downstream side of the valve seat;
   a pressure receiving member movably provided within the pressure governing chamber and coupled with the main valve member into one united body by a coupling member such that the pressure receiving member moves together with and actuates the main valve member into one united body by a coupling member such that the pressure receiving member moves together with and actuates the main valve member by receiving on a front surface and a rear surface a pressure present at the downstream side of the valve seat and a pressure inside the pressure governing chamber;
   a leak route having a small cross-section extending between the inside of the passage at the downstream side of the valve seat and an inside surface of the pressure governing chamber;

a pilot route communicating with the upstream side of the valve seat to the inside surface of the pressure governing chamber; and a constant differential pressure control valve within the pilot route for maintaining a differential pressure constant between an inlet and an outlet of the pilot route by opening when the differential pressure excuses a certain value.

2. A pilot operated flow regulating valve according to claim 1, wherein the constant differential pressure control valve in the pilot route is an electromagnetically actuated valve, the valve of the differential pressure being arbitrarily variable up to a value representing a blocking state of the constant differential pressure control valve by the current supplied to an electromagnetic valve actuating coil.

3. A pilot operated flow regulating valve, comprising:

a main valve member arranged in the vicinity of a valve seat such that a closed state occurs when the main valve member at the valve seat formed in a passage supplying high pressure fluid is contacted by the high pressure fluid from an upstream side;

a pressure governing chamber formed as a branch from the passage at a downstream side of the valve seat;

a pressure receiving member moveably provided within the pressure governing chamber and coupled with the main valve member into one united body by a coupling member such that the pressure receiving member strictly moves together with and actuates the main valve member by receiving on a front surface and a rear surface a pressure present at a downstream side of the valve seat and a pressure inside the pressure governing chamber;

a leak route having a small cross-section extending between an inside of the passage at the downstream side of the valve seat and the inside surface of the pressure governing chamber;

a pilot route communicating with an upstream side of the valve seat to the inside surface of the pressure governing chamber;

a constant differential pressure control valve within the pilot route for maintaining a differential pressure constant between an inlet and an outlet of the pilot route by opening as soon as the differential pressure exceeds a certain a value; and wherein the constant pressure differential pressure control valve in the pilot route is an electromagnetically actuated valve, the value of said differential pressure being arbitrarily variable up to a value representing a blocking state of the constant differential pressure control valve by the current supplied to an electromagnetic valve actuating coil.

4. A pilot operated flow regulating valve comprising:

a main valve member and a valve seat for regulating a flow in a plurality of fluid pipelines wherein two of the fluid pipelines are connected to an upstream side and a downstream side of a pressure loss generating exchanger, the main valve member and the valve seat being located either at an upstream side or a downstream side of the heat exchanger;

a pressure governing chamber and a moveable pressure receiving member within the pressure governing chamber, the pressure receiving member being coupled to the main valve member;

a leak route having a small cross-sectional area communicating one of the plurality of fluid pipelines with inside surface of the pressure governing chamber;

a constant differential pressure control valve for generating a fluid pilot pressure inside the pressure governing chamber by controlling a differential pressure between the fluid pressures in the respective fluid pipelines at the upstream side and the downstream side of the heat exchanger; and wherein the constant differential pressure control valve controls the differential pressure to an arbitrary constant differential pressure by electromagnetic force.

5. A pilot operated flow regulating valve according to claim 4, wherein the constant differential pressure control valve is connected in series between the pressure governing chamber and one of the plurality of pipelines upstream and downstream of the heat exchanger wherein the one of the plurality of pipelines does not extend the valve seat.

6. A pilot operated flow regulating valve according to claim 4, wherein the pressure governing chamber is communicating with the plurality of pipeline which does not extend to the valve seat via the leak route and wherein the constant differential pressure control valve is connected between the other of the plurality of fluid pipelines extending to the valve seat and the pressure governing chamber.

7. A pilot operated flow regulating valve according to claim 4, wherein a front surface and a rear surface of the pressure receiving member have larger pressure areas than the main valve member, preferably a pressure area which is approximately 2 to 10 times bigger.

8. A pilot operated flow regulating valve according to claim 7, wherein the pressure area of the front and the rear surface of the pressure receiving member is in the range of 2 to 20 times larger than the pressure area of the main valve member.

* * * * *